United States Patent [19]

Prager

[11] Patent Number: 6,003,027
[45] Date of Patent: Dec. 14, 1999

[54] SYSTEM AND METHOD FOR DETERMINING CONFIDENCE LEVELS FOR THE RESULTS OF A CATEGORIZATION SYSTEM

[75] Inventor: John Martin Prager, Pomona, N.Y.

[73] Assignee: International Business Machines Corporation, Armonk, N.Y.

[21] Appl. No.: 08/976,349

[22] Filed: Nov. 21, 1997

[51] Int. Cl.$^6$ .................................................. G06F 17/30
[52] U.S. Cl. .................................................. 707/5; 707/6
[58] Field of Search ............................................ 707/5, 6

[56] References Cited

U.S. PATENT DOCUMENTS

| | | | |
|---|---|---|---|
| 4,414,629 | 11/1983 | Waite | 705/28 |
| 5,640,553 | 6/1997 | Schultz | 707/5 |
| 5,659,742 | 8/1997 | Beattie et al. | 707/104 |
| 5,680,511 | 10/1997 | Baker et al. | 704/257 |
| 5,717,914 | 2/1998 | Husick et al. | 707/5 |
| 5,742,816 | 4/1998 | Barr et al. | 707/104 |

OTHER PUBLICATIONS

Yahoo (http://www.yahoo.com) screen shot of search for "France" within "soccer" category. 3 pages.
Alta Vista (http://www.altavista.digital.com) screen shot of results of search for "France football" showing language tags. 2 Pages.
G. Salton "Automatic Text Processing: The transformation, Analysis and Retrieval of Information by Computer", Addison–Wesley, Reading, PA, 1989, pp. 313–326.
W. Feller "An introduction to Probability Theory and its Applications," John Wiley & Sons, Inc., 1950, pp. 26–54.
G. Shafer "Perspectives on the Theory and Practice of Belief Functions," International Journal of Approximate Reasoning, vol. 4, Elsevier, 1990, pp. 323–363, 1995.
D. Harmon "Ranking Algorithms" appearing as chapter 14 of "Information Retrieval: Data Structures and Algorithms" by Frakes & Baeza–Yates, Prentice–Hall, 1992, pp. 363–392.

*Primary Examiner*—Wayne Amsbury
*Attorney, Agent, or Firm*—Louis J. Percello; Rabin & Champagne P.C.

[57] ABSTRACT

After a categorization process has been run, the scores of the top-two ranking categories along with the size or number of features in the object being categorized, are passed to a confidence assignment process. This determines a value for the confidence in the top category based on the evidence afforded by the input parameters. The magnitude of this confidence value will determine whether the system can accept the automatic categorization results, or whether human involvement is required. This invention also describes the process of determining the optimal value of an internal scaling parameter in the confidence assignment process. The construction of a threshold table based on this parameter is also described. The threshold table matches confidence values against error levels. For a given error rate the previously assigned confidence determines whether the categorization results can be accepted without need for human intervention. This invention maximizes the number of objects that can be automatically processed, for a given error rate.

20 Claims, 8 Drawing Sheets

| RUN | OBJ. ID | RESULTS | CONF. | CORRECT | CUM | CUM RATIO |
|---|---|---|---|---|---|---|
| 1 | O1 | p1 | .63 | 1 | 1 | 1.0 |
| 2 | O2 | p2 | .67 | 1 | 2 | 1.0 |
| 3 | O3 | p3 | .67 | 0 | 2 | .67 |
| ... | ... | ... | ... | ... | ... | ... |
| ... | ... | ... | ... | ... | ... | ... |
| 1000 | O1000 | p1000 | .75 | 1 | 633 | .633 |

| %CORRECT | CONFIDENCE | #OBJECTS (BASE-LINE) | #OBJECTS | DIFF |
|---|---|---|---|---|
| 60 | .46 | 1000 | 1000 | 0 |
| 65 | .57 | 840 | 895 | 55 |
| ... | ... | ... | ... | ... |
| ... | ... | ... | ... | ... |
| 95 | .87 | 56 | 206 | 150 |

SYSTEM AND METHOD FOR DETERMINING CONFIDENCE LEVELS FOR THE RESULTS OF A CATEGORIZATION SYSTEM

FIELD OF THE INVENTION

This invention relates to the field of categorization, including, but not limited to, document categorization. More specifically, the invention relates to determining the confidence of results from categorization systems.

BACKGROUND OF THE INVENTION

Broadly speaking, there are two ways to find objects such as documents in a large collection: by search and by navigation. Searching involves specifying a query which a search engine will match against previously indexed objects, and return a hit-list of the best matching objects, possibly with an associated relevance score. The IBM SearchManager/2, a trademark of the IBM Corporation, is an example of such a system. The methods of indexing and searching for documents are well-known in the industry.

Navigation is possible if the objects have been previously organized into, e.g., a hierarchy. This organization will have been developed by categorizing the objects by selected criteria. Given such a system, the user typically finds an object by starting at a well-defined point such as the top of the hierarchy, and progressing down to levels of greater and greater specificity until a leaf-node category is reached, which contains just a few objects, where the desired one or ones can be found by inspection. In addition, systems can offer a combination of search and navigation. Yahoo (http://www.yahoo.com) is an example of such a system.

A categorization system takes an object such as a document and assigns to it one or more labels from a pre-defined set. The labels available correspond to the categories under consideration.

The categories form a way of grouping objects that are similar according to one or more criteria. For example, the set of categories might correspond to the language a document is written in. The label for a category, and for documents in that category, will be the name of the language. World-Wide-Web search engines such as AltaVista (http://www.altavista.digital.com) associate a language tag with every document returned in a hit list. These tags were assigned by an automatic process.

Another useful categorization scheme is by subject-matter. Yahoo has categorized several hundred thousand documents into tens of thousands of categories, although this process was done by hand. However, to keep track of huge collections such as the World-Wide-Web, or to develop navigation systems for company intranets or other domains, categorizing automatically is of increasing importance.

There are several different methods to perform categorization: two will be described here in the context of text document categorization. All methods require a set of categories, and a set of previously categorized objects, for training. The so-called 'centroid' or 'vector-space' method works as follows. A feature-selector program is used to extract interesting qualities from the documents. These features are usually words, possibly with common words or 'stop-words' (such as 'the', 'of', etc.) filtered out. For each category, a vector is generated from the documents assigned to that category. The positions in the vector correspond to the features, the value at a given position the number of occurrences of the feature in the set of documents making up the category. A similar such vector is generated for the document to be categorized. Then for each category, the 'cosine-distance' is calculated between the category vector and the test document vector. The cosine-distance is the scalar product of the two vectors divided by the product of the vector magnitudes; it is also equal to the cosine of the angle between the vectors in n-space. Since it is a cosine, it falls in the range 0–1, where 0 represents orthogonality and 1 exact correspondence. In this way, the system generates a hit-list of categories with matching scores. For a description of vector-space methods in Information Retrieval, see G. Salton, "Automatic Text Processing: The Transformation, Analysis and Retrieval of Information by Computer", Addison-Wesley, Reading, Pa., 1989.

Another common method is the KNN, or K-nearest-neighbor method. In this method the document to be categorized is treated as a query to a search engine, whose index is generated from all of the documents in the categorizer's training set. The hit-list generated here is the list of the best-matching documents to the one in question. The top K documents from this list are selected. Since each document is part of the training set, it has been assigned to one or more categories. Hence each document imparts a 'vote' to each category it belongs to. This vote may be weighted by unity or by the relevance score returned by the search engine. In any case, the total number of votes received by each category is tallied, and used to provide the category hit-list.

Given the category hit-list, systems usually employ one of the following techniques for purposes of committing category assignments to the document: 1) the top category is selected, 2) the top m categories are selected, for some pre-defined constant m, 3) all categories which have a score greater than a threshold t are selected, and 4) the top category plus any categories which have a score greater than a threshold t are selected.

If relevance ranking values are considered to be probabilities, then the confidence one has in their correctness can be computed by standard probability theory, as found in any standard text book on Probability Theory—see for example W. Feller "An Introduction to Probability Theory and its Applications", John Wiley & Sons, Inc., 1950. Alternatively, the values can be treated as evidence, and the appropriate theory is the Dempster-Shafer Theory of Evidence (see: Shafer, G., "Perspectives on the Theory and Practice of Belief Functions", International Journal of Approximate Reasoning, Vol 4, Elsevier 1990, pp 323–363.).

STATEMENT OF PROBLEMS WITH THE PRIOR ART

When an object is categorized by an automatic categorization system, the system proposes one or more categories, possibly with a ranking value or score associated with each nominated category. This score is a measure of the degree of match between the object and the category. The problem is that this score is not (alone) a sufficient quantifier of whether the categorization results are acceptable, as is demonstrated below. In a situation (such as in indexing World Wide Web documents) where there are huge numbers of objects to be categorized, it is essential for an automatic system to assist human operators by taking on a large proportion of the categorization workload. In these situations it is imperative that the systems operate autonomously on the vast majority of the objects, and only defer a small number of the more problematic cases to human judgment. In order to do this it is necessary for the system to recognize when the problematic cases occur, that is, when the results of the automatic system are not supportable.

It is desirable that the score given an object in a categorization system be scaled on a range of 0–1, for example, so that it can be interpreted as a probability that the proposed category is correct. If this is done then a threshold in the range 0–1 can be set so that if the top category (or categories) assigned to an object exceed the threshold, they are accepted, otherwise the object needs human assessment. Consider a system in where only the top-ranked category for each object is accepted. Suppose that a certain object's categorization results are headed by two categories with very high scores—0.99 and 0.98, say. Suppose the acceptance threshold is 80%. Although prior art systems would allow the top category to be accepted, this is an incorrect action, since although it is clear that one of the top two categories should be accepted, each one's realistic probability of being correct is about 50%. One can view the set of features as a statistical sample, where the smaller the sample the more doubt one would have about the sample's validity. Therefore the smaller the object was (i.e. the fewer features it had), the more unacceptable the top category's score would be.

Consider another situation, again with a 0.80 acceptance threshold. Consider two objects, O1 and O2. O1's top category C11 has a score of 0.89, while O2's top category C21 is 0.75. A prior art automatic system will accept O1's category and reject O2's. However, suppose O1's second-ranked category C12 has a score of and O1 was short (i.e. has few features). Then this would be a similar situation to that described in the previous paragraph. Suppose O2's second ranked category C22 has a score of 0.11, and O2 is large (i.e. has many features). A strong argument can be made that O1's top category should be rejected, and O2's accepted, the exact opposite situation to what prior art systems would achieve.

OBJECTS OF THE INVENTION

An object of this invention is a system and method that categorizes documents.

An object of this invention is a system and method that categorizes documents with an accurate confidence level of the category for each document categorized.

An object of this invention is a system and method that generates a threshold table relating confidence thresholds to acceptable error rates.

An object of this invention is a system and method that determines if a document to be categorized needs human intervention or can be processed entirely automatically.

SUMMARY OF THE INVENTION

The present invention is a system and method for determining confidence levels associated with the results of a categorization system. The objects of the categorization system are typically, but need not be, documents. Categorization may be by subject-matter, language or other criteria.

The results of the categorization process, in particular the scores of the top-two ranking categories along with the size or number of features in the object being categorized, are passed to a confidence assignment process. This determines a value for the confidence in the assignment of the top category based on the evidence afforded by the input parameters. The magnitude of this confidence value determines whether the system can accept the automatic categorization results, or whether human involvement is required.

Prior to deployment, an internal scaling parameter, k, in the confidence assignment process (CAP) is determined by running the process on a test set of manually-categorized objects, in order to determine which value of the parameter maximizes the number of objects whose automatic categorization results can be accepted.

One outcome of the determination of the scaling parameter's value is the completion of a threshold table, matching confidence values against error levels. Then for a given error rate, an object will be categorized, the confidence assignment function run on the results, and the resulting confidence value looked up in the threshold table. If the confidence value equals or is greater than the value in the table corresponding to the selected error rate, the categorization results can be accepted without need for human intervention.

BRIEF DESCRIPTION OF THE DRAWINGS

The foregoing and other objects, aspects and advantages will be better understood from the following detailed description of preferred embodiments of the invention with reference to the drawings that are include the following:

FIG. 2, comprises FIGS. 2a, 2b and 2c, where

FIG. 4, comprises FIGS. 4a and 4b, where

FIG. 7 comprises FIGS. 7a and 7b, where

DETAILED DESCRIPTION OF THE INVENTION

Figure 1:
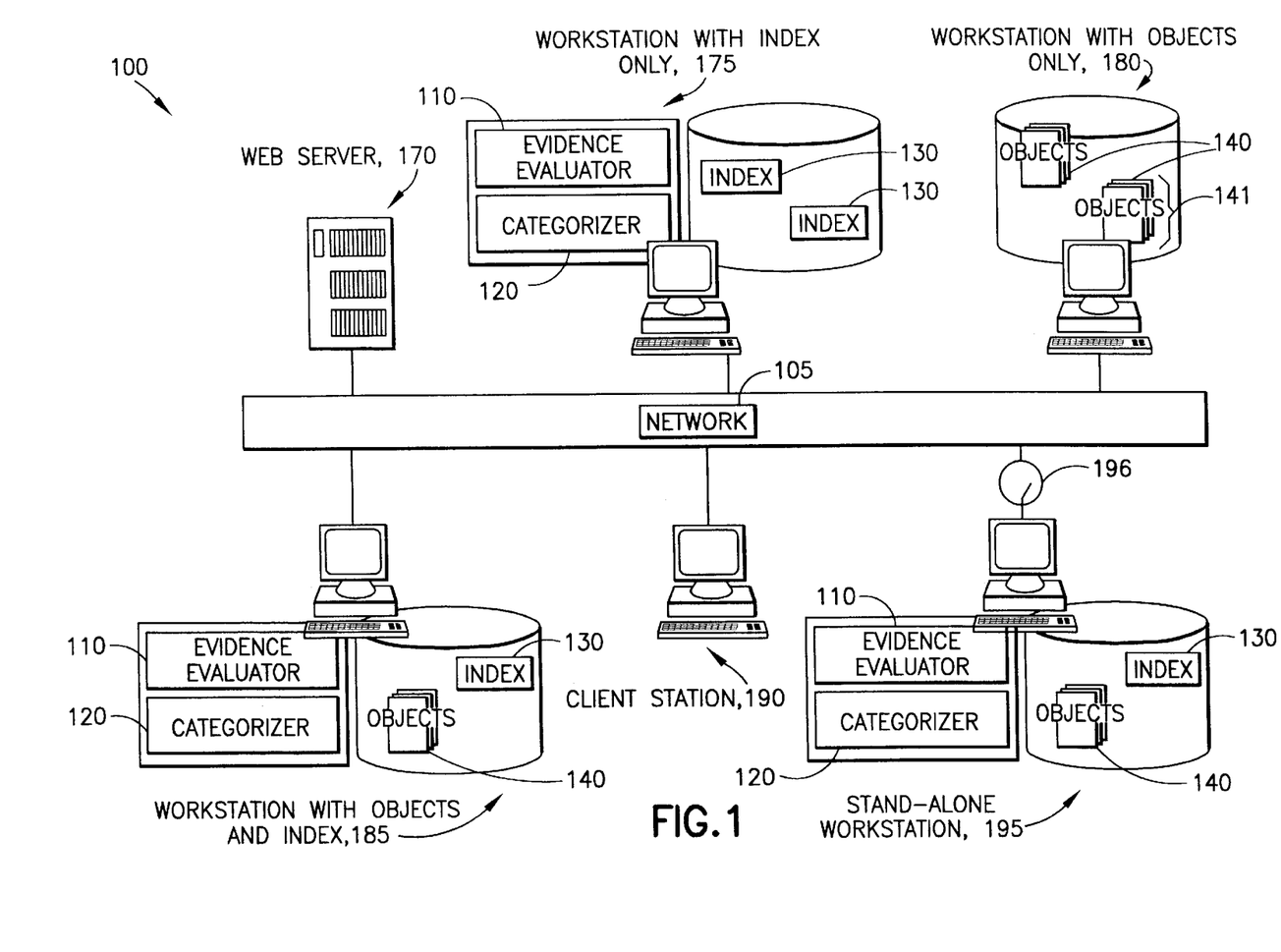
FIG. 1 is a block diagram of the various system configurations that are preferred embodiments of this invention.

FIG. 1 is a block diagram of the computing environment in which the present invention is used in a non limiting preferred embodiment. The figure shows some of the possible hardware, software, and networking configurations that make up the computing environment. The computing environment or system 100 comprises one or more general purpose computers 170, 175, 180, 185, 190, and 195 interconnected by a network 105. Examples of general purpose computers include the IBM Aptiva personal computer, the IBM RISC System/6000 workstation, and the IBM POWERparallel SP2. (These are Trademarks of the IBM Corporation.) The network 105 may be a local area network (LAN), a wide area network (WAN), or the Internet. Moreover, the computers in this environment may support the Web information exchange protocol (HTTP) and be part of a local Web or the World Wide Web (WWW). Some computers (e.g., 195) may occasionally or always be disconnected 196 from the network and operate as stand-alone computers.

Objects 140 are items such as books, articles, reports, pictures, movies, or recordings that contain text, images, video, audio, or any other object and/or information that may be categorized. One or more objects are stored on memory on one or more computers in the environment.

To categorize a particular object in the environment, the object (see FIG. 2A) is submitted for processing to a categorizer 120 running on a computer in the environment. The categorizer uses an index 130 to identify categories that are relevant to the object. The categorizer creates an index 130 by indexing a particular set of manually-categorized objects 141 in the environment. This object collection 141 may comprise objects located anywhere in the computing environment, e.g., spread across two or more computers. The relevant categories identified by the index are ranked and returned by the categorizer in the form of a hit-list (see FIG. 2C). The process is well known in the prior art.

The result of the categorization is further processed by submitting the categorization results to a novel evidence evaluator 110. The evidence evaluator 110 uses information in the hit-list, along with the size of the object, to improve the search result scores. The improved scores allow more objects to be automatically categorized at a given error-level than previously. For convenience, the categorizer 120 and evidence evaluator 110 are shown here as separate components. Note, however, that both systems may be internal components of a general object categorization system.

Objects 140 and/or indexes 130 on one computer may be accessed over the network by another computer using the Web (http) protocol, a networked file system protocol (e.g., NFS, AFS), or some other protocol. Services on one computer (e.g., categorizer 120) may be invoked over the network by another computer using the Web protocol, a remote procedure call (RPC) protocol, or some other protocol.

A number of possible configurations for accessing hypermedia objects, indexes, and services locally or remotely are depicted in the present figure. These possibilities are described further below.

One configuration is a stand-alone workstation 195 that may or may not be connected to a network 105. The stand-alone system 195 has objects 140 and an index 130 stored locally. The stand-alone system 195 also has a categorizer 120 and evidence evaluator 110 installed locally. When the system is used, an object is input to the workstation 195 and processed by the local categorizer 120 and evidence evaluator 110 using the index 130. The results from the categorizer are output by the workstation 195.

A second configuration is 185, a workstation with objects and indexes connected to a network 105. This configuration is similar to the stand-alone workstation 195, except that 185 is always connected to the network 105. Also, the local index 130 may be derived from local objects 140 and/or remote objects accessed via the network 105, and created by either a local categorizer 120 and evidence evaluator 110 or a remote categorizer 120 and/or a remote evidence evaluator 110 accessed via the network 105. When queries are input at the workstation 185, they may be processed locally at 185 using the local categorizer 120, local evidence evaluator 110, and local index 130. Alternatively, the local categorizer 120 and evidence evaluator 110 may access a remote index 130 (e.g. on system 175) via the network 105. Alternatively, the workstation 185 may access a remote categorizer 120 and/or evidence evaluator 110 via the network 105.

Another possible configuration is 175, a workstation with an index only. Computer 175 is similar to computer 185 with the exception that there are no local objects 140. The local index 130 is derived from objects 140 accessed via the network 105. Otherwise, as in computer 185, the index 130, categorizer 120, and evidence evaluator 110 may be accessed locally or remotely via the network 105 when processing objects.

Another possible configuration is computer 180, a workstation with objects only. The objects 140 stored locally at computer 180 may be accessed by remote categorizers 120 and evidence evaluators 110 via the network 105. When objects are entered at computer 180, the categorizer 120, evidence evaluator 110, and index 130 must all be accessed remotely via the network 105.

Another possible configuration is computer 190, a client station with no local objects 140, index 130, categorizer 120, or evidence evaluator 110. When objects are entered at computer 190, the categorizer 120, evidence evaluator 110, and index 130 must all be accessed remotely via the network 105.

Another possible configuration is computer 170, a typical web server. Objects are entered at another workstation (e.g., 175, 180, 185, or possibly 195) or a client station (e.g., 190) and sent for processing to the web server 170 via the network 105. The web server 170 uses a remote categorizer 120, evidence evaluator 110, and index 130 (accessed via the network 105) to process the object. Alternatively, one or more of these functions (110, 120, and 130) can reside on the web server 170. The results are returned to the workstation or client station from which the object was originally sent.

Figure 2A:
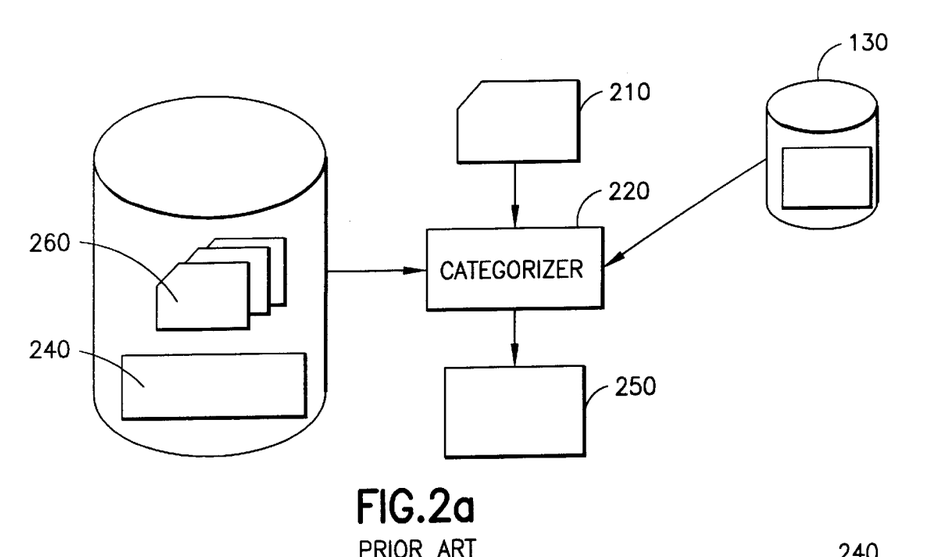
FIG. 2a is a block diagram of a prior art categorization system.
Figure 2B:
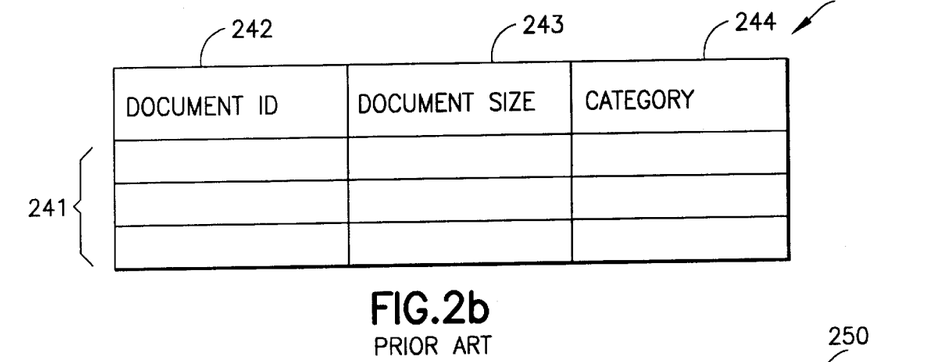
FIG. 2b is a prior art category table and FIG. 2c is a prior art results table.
Figure 2C:
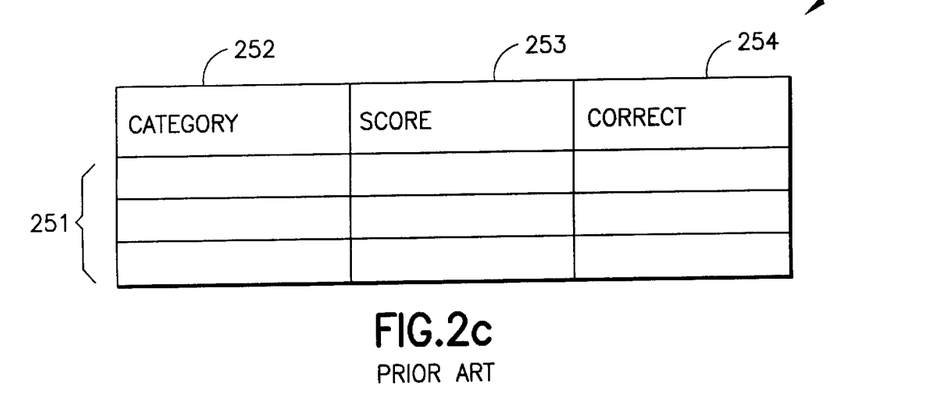

FIG. 2, comprising FIGS. 2a, 2b and 2c, depicts a typical prior art categorization process and data structures. Block 210 is an input object to be categorized, block 220 is a prior art categorizer, and block 250 a results table. Block 260 is a collection of manually-categorized objects; these are to be used as a test set and were conventionally not used to train the categorizer 220. Block 240, the category table, has rows 241 corresponding to the objects 260. Column 242 contains the object id, column 243 the object size (or count of features) and column 244 contains the category or categories to which the object is assigned.

The results table 250 contains rows 251 for the top categories assigned to the object 210 under consideration. Column 252 lists the categories, 253 the computed score, and column 254, by reference to category table 240, a flag indicating whether the categorization result is correct or not.

See the Salton 1989 reference cited earlier.

The evidence evaluator 110 consists of all of the components listed in FIGS. 3 through 7.

Figure 3:
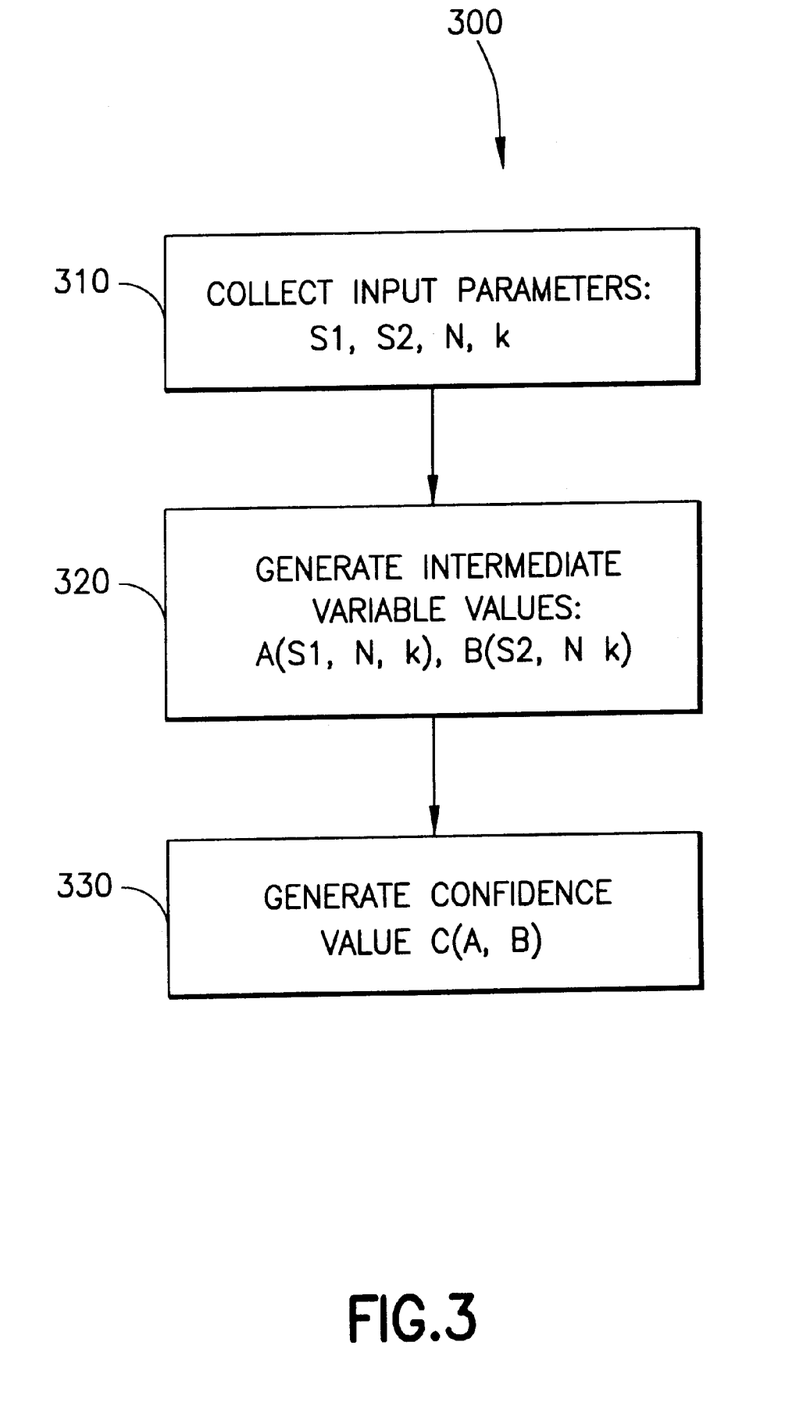
FIG. 3 is a flow chart of the steps of the confidence assignment process.

FIG. 3 is a flowchart showing the process 300 (640) by which the confidence in the top-ranked category is calculated.

The scores of the top-two ranking categories, S1 and S2, provide evidence that the top-category is correct. S1 is evidence that the top category is correct, S2 that another category is. In addition, the more features N in the object being categorized, the more believable the categorization results are.

The next step can be clarified by means of an analogy. Consider the situation where you have a bag of balls, 90% are white and 10% not. Balls will be taken out with replacement. If you take one ball, the probability it is white is 0.9. If two balls are taken (in turn), the probability that at least one is white one is $1-(1-0.9)^{}2$. In other words, the probability is calculated as the probability that they are not both not-white. Similarly, if b balls are taken the probability that at least one will be white is $1-(1-0.9)^{}b$. Clearly, the more balls are taken out, the greater the probability that a white one will be gotten at some point. Here the feature-set of the object is considered to be make up of 'chunks' of size k, and each chunk is likened to the balls above. The chunks offer evidence of the object's categorization scores being correct, the more chunks there are the more likely the evidence is correct.

So, the scores S1 and S2 are both reinforced by a function of N. Since twice the number of features does not necessarily mean twice the evidence, due to redundancy, a sublinear function is required. In the field of Information Retrieval, the commonly-used IDF term in ranking formulas (inverse document frequency), is used to weight term-occurrence according to the fraction of documents a term occurs in. Rather than using the obvious formula N/ni (total number of documents divided by number of documents term i occurs in), the formula log(N/ni) and variations are used. See for a review of ranking algorithms the article "Ranking Algorithms" by Donna Harmon, appearing as chapter 14 of "Information Retrieval: Data Structures and Algorithms" by Frakes & Baeza-Yates, Prentice-Hall 1992. This disclosure follows this practice and uses the log as well.

In a preferred embodiment, the function employed is log(1+N/k), for some k to be determined later. That is, even though the feature-set has N/k chunks, the contribution of N is down-weighted by applying a log function. Therefore, in the place of the exponent b earlier, log(1+N/k) is used.

k has a physical significance related to the number of features in a chunk of evidence. For example, in some experiments performed by the present author, words in document text were used as features. The value N represented the size of the document being examined, measured in bytes. Each byte encoded one character. The confidence assignment process described herein was determined to perform best (that is, it permitted the greatest number of documents to be automatically categorized without human intervention) for values of k between 50 and 100. This range corresponds to the number of characters in a 'typical' sentence. Thus the system operated optimally when sentence-sized chunks were used.

The evidence in favor of the top category is therefore $1-(1-S1)^{}\log(1+N/k)$, and of another category is $1-(1-S2)^{}\log(1+N/k)$. The two measures of evidence for the top category are combined by multiplying them together, and normalizing. This step (multiplying and normalizing) is known as Dempster's formula, and may be found in the Shafer reference cited earlier.

In step 310 input parameters S1, S2 N and k are collected. S1 is the score of the top-ranked category, and is read from column 253 of the first row 251 from table 250. S2 is the score of the second-ranked category, and is read from column 253 of the second row 251 from table 250. N is the length or size of the object 210, and is read from column 243 of table 240. k is a scaling constant and its optimum value is determined later. Initially it can be set to the square root of the average number of features used by categorizer 220 for a typically-sized object. This value of k is entered into field 720 of the first record of the improvement table 710.

In step 320, intermediate variable values are calculated. Intermediate value A is calculated as $(1-S1)^{}\log(1+N/k)$, while B is calculated as $(1-S2)^{}\log(1+N/k)$. 1−A can be thought of as the credibility of the assertion that the top-ranked category is the correct one, and 1−B can be thought of as the credibility of the assertion that some other category is the correct one. A and B would therefore correspond to the lack of credibility in the corresponding assertions.

To normalize a dividing factor that represents all possible outcomes is used. What is not possible is that both the top category and some other category are simultaneously correct. Either one or both must be incorrect. One minus this factor represents the sum of all these other, possible, situations. The normalization factor is therefore $(1-(1-A)^{*}(1-B))=(A+B-AB)$. In step 330 the confidence to be assigned the top category is calculated as $B^{*}(1-A)/(A+B-AB)$.

It should be noted here that for simplicity and convenience only the top two scores are considered. A more refined version of this formula will consider the third-placed category's score, and maybe others. However, the principal ingredient in the evidence that the top category is incorrect is the score given to the second category; considering the others is a case of diminishing returns, and is not expected to make much difference to the end results, except possibly in pathological cases.

Figure 4A:
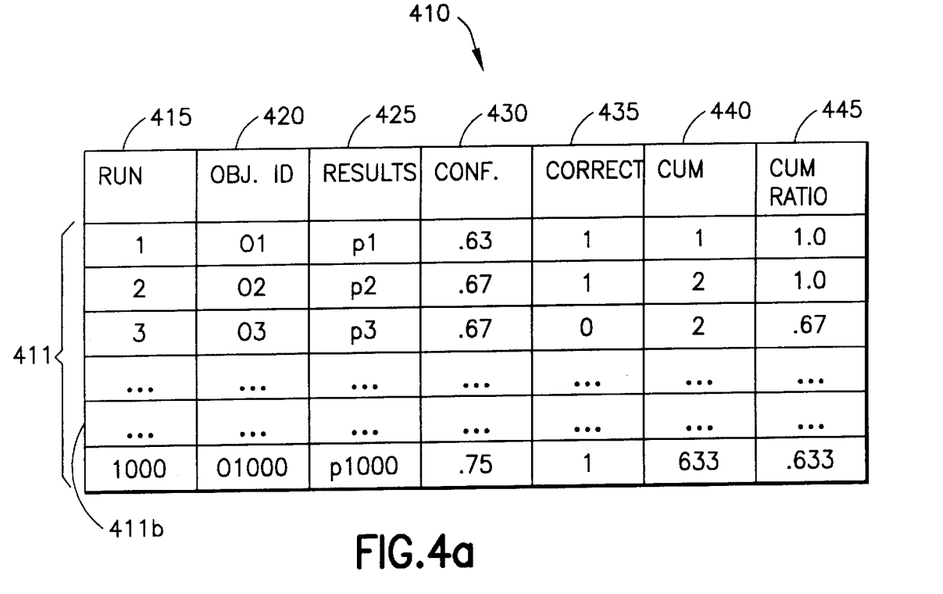
FIG. 4a shows a cumulative score table.
Figure 4B:
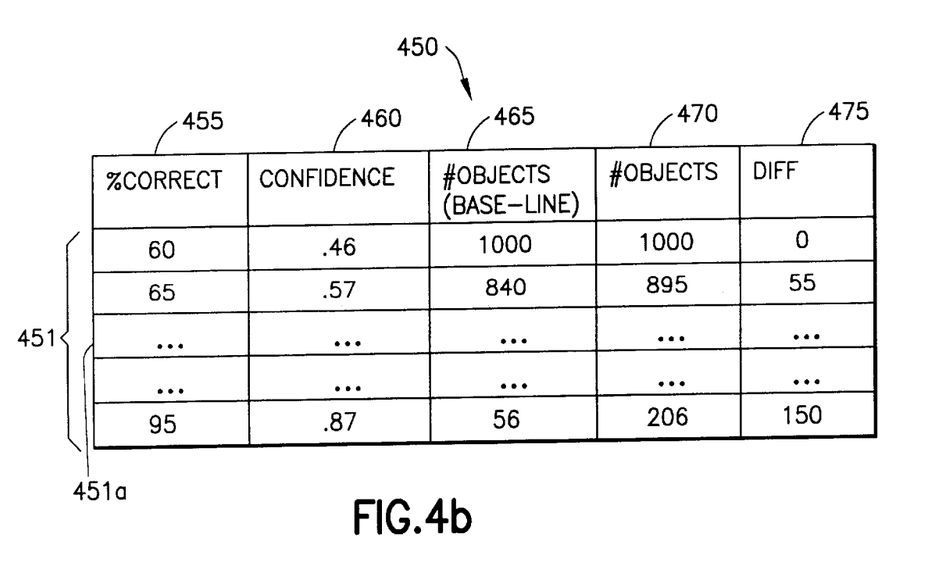
FIG. 4b shows a threshold table.

FIG. 4, comprising FIGS. 4a and 4b, shows preferred data-structures to support the process of calibrating k, a unit of measurement of the frequency of occurence of all the features. Numerical values in the table cells are for illustrative purposes only; they depict a hypothetical situation where 1000 manually-categorized objects are categorized, 633 of them successfully.

Rows 411 in cumulative score table 410 consist of run number 415, object id 420, pointer 425 to corresponding results table 250, score 430, correctness flag 435, cumulative correct count 440 and cumulative correctness ratio 445. The purpose of the cumulative score table 410 is to track the performance of the confidence generation process; the table is filled in during the execution of steps 530, 540 and 560 of base-line confidence generation process 500. Rows 451 in threshold table 450 consist of percent-correct number 455, confidence score 460, base object count 465, current object count 470 and difference 475. Threshold table 450 is filled in in step 570 of base-line confidence generation process 500.

Figure 5:
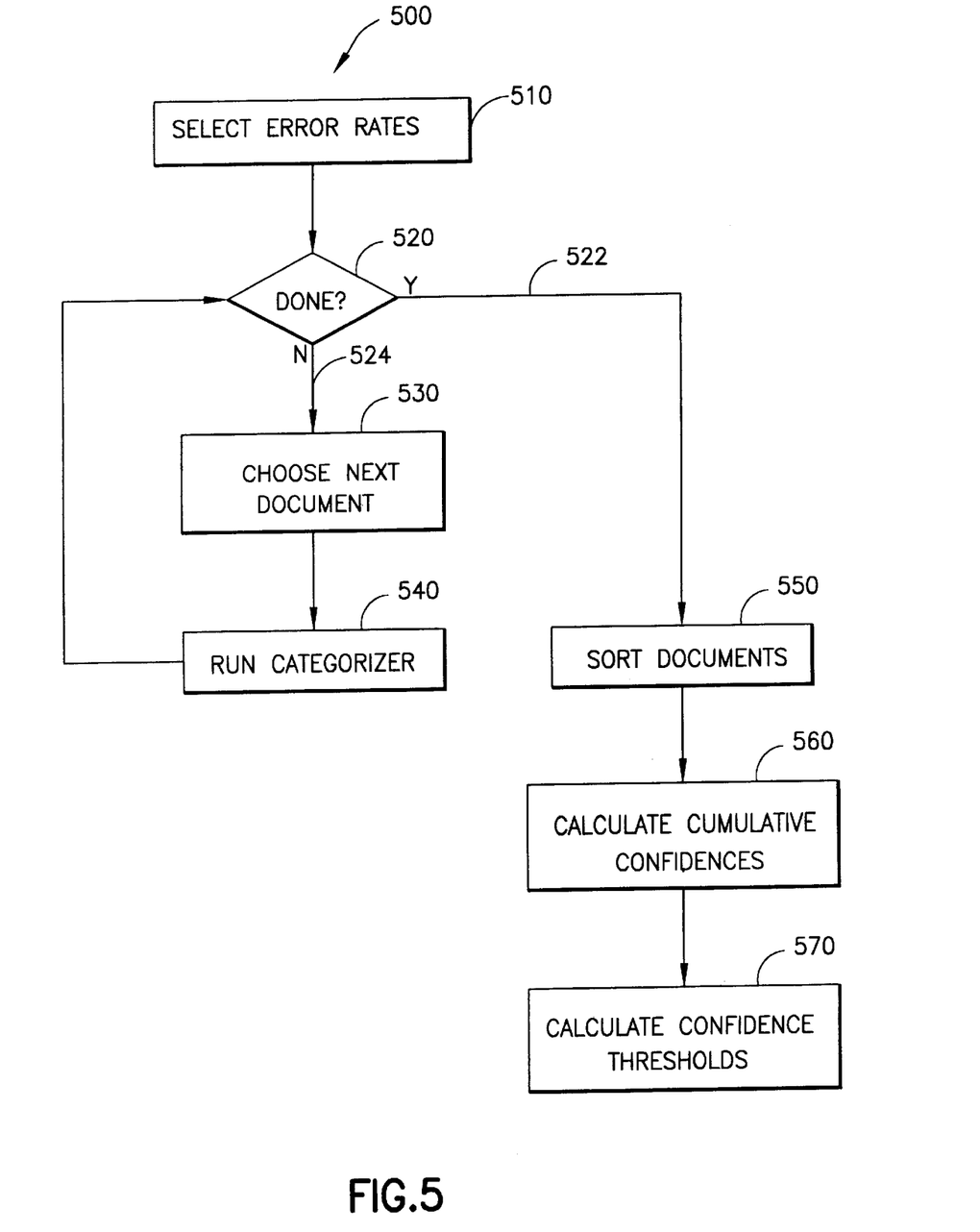
FIG. 5 is a flow chart of the steps of determining base-line thresholds.

FIG. 5 is a flowchart showing the method steps of one preferred process 500 executed by the present invention. This process does not involve the confidence assignment function. The purpose of this process is to populate the threshold table 450 with base-line data, representing the capability of a categorization system without the benefits of the present invention. Cumulative score table 410 is filled in as an intermediate step in this process. The end-result of this process is a table which will inform a user of a categorization system, by comparing the top-category's score with the entry in the table corresponding to the desired error-rate, whether the results of the categorization are acceptable, or should be submitted to human assessment. In addition, the table 450 contains counts 465 of how many objects in the test set were accepted at each error-level, thus providing a basis for computing improvements later.

In step 510 the user selects one or more error-levels at which the system will be operated (e.g. 40%, 35% . . . 5%). The complements of these numbers (e.g. 60%, 65% . . . 95%) are entered in field 455 of threshold table 450. The set of test documents 260 is readied. Sequential integers from 1 to the number of objects in test set 260 are entered down run sequence number column 415. Step 520 runs the loop which iterates through all objects in test set 260. If there are no more documents, control passes down branch 522, else down branch 524. In step 530, the next object 260a is chosen, a new row 411a in cumulative score table 410 is started, the run sequence number 415a is entered (this is one more than the previous run sequence number, or 1 if this is the first), the object id of object 260a is entered in field 420a.

In step 540 the categorizer 220 is run, with results being placed in a newly generated table 250. For the top-scoring category in table 250, the score 253 is copied into confidence field 430a of row 411a, and correctness flag 254 is copied into field 435a. A pointer to table 250 is put in results field 425a.

In step 550 the rows of cumulative score table 410 are sorted in increasing order of the confidence score in column 430. The rows are resequenced in column 415 so again the top row has value 1, the second 2 and so on.

In step 560 cumulative correctness scores are entered into field 440 of table 410 as follows: in the first row, the field 440 takes the value of correctness value 435. In each succeeding row, field 440 is computed as the sum of field 435 of that row plus field 440 of the previous row. Cumulative correctness ratio 445 is calculated as the correctness value 440 divided by the row number 415.

In step 570 the number of documents that pass a given correctness level are calculated as follows, for each row 451a of threshold table 450. Field 455 is identified as the current level of interest. Column 445 of cumulative score table 410 is scanned from the bottom up, until reaching row 411b which is defined to be the first time a value 445 is reached that equals or is greater than the level of interest in field 455. The confidence score that corresponds to this correctness level is read out of field 430 of row 411b and is written into field 460 of row 451a. The number of objects whose score is equal to or exceeds this value is read out of field 415 of row 411b and is written into field 465 of row 451a.

At this point, the threshold table 450 allows the categorization system to be used automatically at any desired error-level. For a selected error-level, its complement is looked up in column 455 and the corresponding confidence score is read out from column 460. Any categorization result with score greater than or equal to this can be accepted without the need for human intervention.

So far, the confidence assignment process 300 based on the statistical model described earlier has not been used. The remainder of the invention description illustrates how the confidence assignment function can be used to improve the number of documents that can be automatically categorized by this process, and how the controlling parameter k can be optimized.

Figure 6:
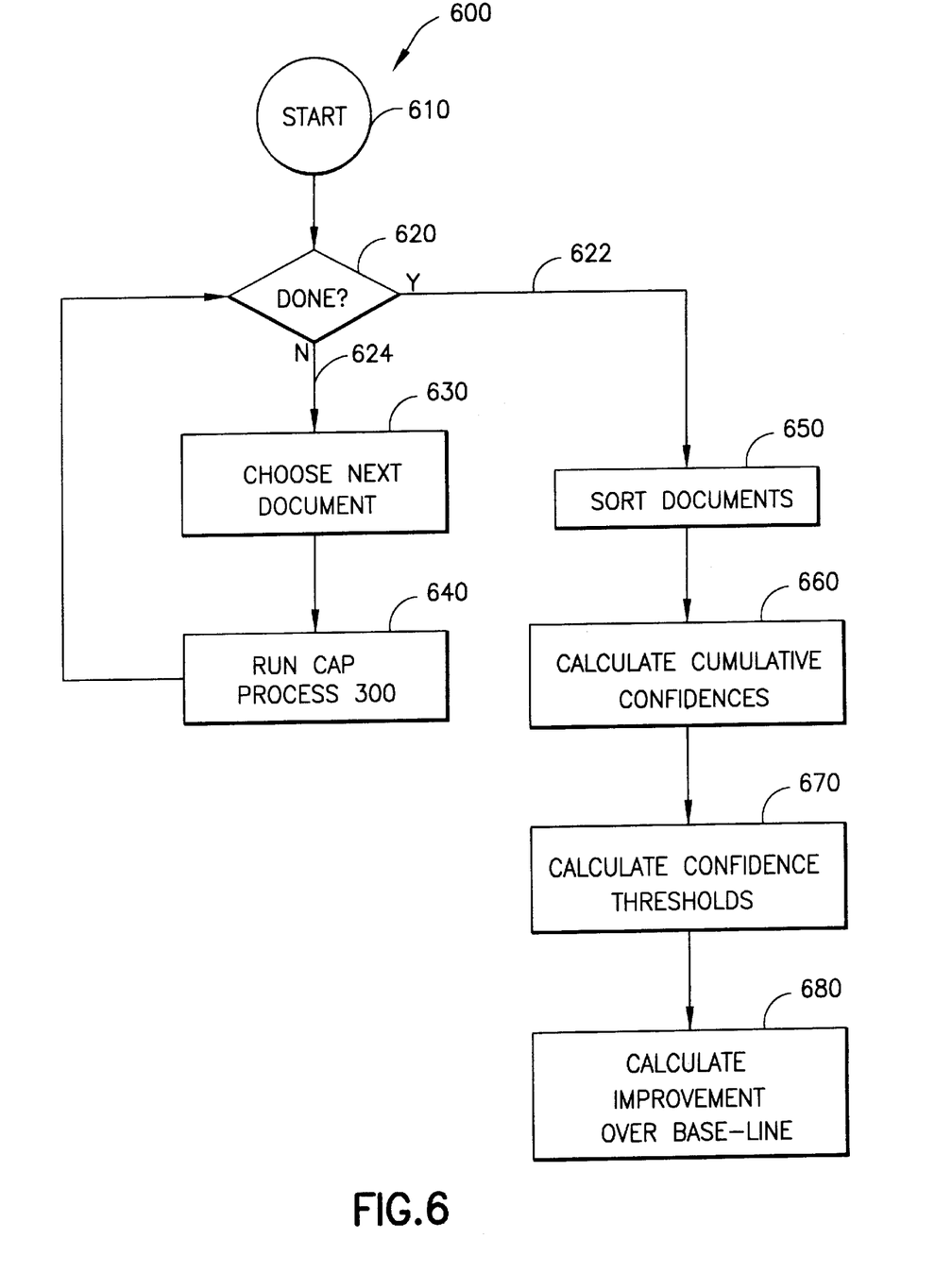
FIG. 6 is a flow chart of the steps of determining the improvement afforded by a given scaling constant.

FIG. 6 is a flowchart showing the method steps of one preferred process executed by the present invention.

This process is similar in form to process 500 depicted in FIG. 5, although in this case the confidence assignment process 300 is used. Process 600 will, for a given value of scaling parameter k, fill in a column of confidences in the threshold table by applying the confidence assignment process 300 to the categorization results of process 500. In addition, the table 450 will contain counts 470 of how many objects in the test set were accepted at each error-level. By comparing this set of numbers with those generated into column 465 by the base-line process 500, the improvement can be calculated, namely how many more objects, at the same error level, can be automatically categorized without human involvement.

In step 610 a set of test documents 260 is readied. Step 620 runs the loop which iterates through all objects in test set 260. If there are no more documents, control passes down branch 622, else down branch 624. In step 630, the next object 260a is chosen, and corresponding row 411a in cumulative score table 410 is located, by reference to object id 420.

In step 640 the confidence assignment function process 300 is run, using as input the two top scores 253 found by following results pointer 425 to results table 250, and object size 243 found by looking up object id 420 in column 242 of category table 240. The resulting confidence score is placed in confidence field 430 of row 411a. Correctness flag 435 does not need to be updated.

It should be noted that step 640 of process 600 is the first major divergence between processes 500 and 600. The corresponding step 540 of process 500 simply uses the categorizer's raw score as putative confidence value. Step 640 of process 600 applies the confidence assignment process 300, which implements the probabilistic-statistical model of evidence combination described earlier.

In step 650 the rows of cumulative score table 410 are sorted in increasing order of the confidence score in column 430. The rows are resequenced in column 415 so again the top row has value 1, the second 2 and so on.

In step 660 cumulative correctness scores are entered into field 440 of table 410 as follows: in the first row, the field 440 takes the value of correctness value 435. In each succeeding row, field 440 is computed as the sum of field 435 of that row plus field 440 of the previous row. Cumulative correctness ratio 445 is calculated as the correctness value 440 divided by the row number 415.

In step 670 the number of documents that pass a given correctness level are calculated as follows, for each row 451a of threshold table 450. Field 455 is identified as the current level of interest. Column 445 of cumulative score table 410 is scanned from the bottom up, until reaching row 411b which is defined to be the first time a value 445 is reached that equals or is greater than the level of interest in field 455. The confidence score that corresponds to this correctness level is read out of field 430 of row 411b and is written into field 460 of row 451 a. The number of objects whose score is equal to or exceeds this value is read out of field 415 of row 411b and is written into field 470 of row 451a.

Figure 7A:
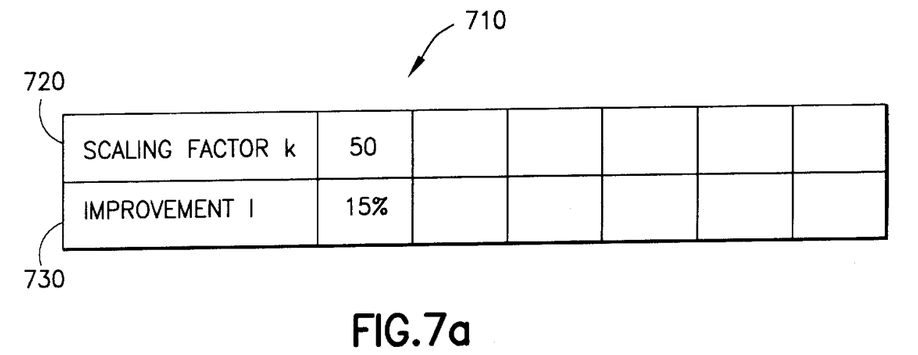
FIG. 7a shows an improvement table.

For each row 451 of threshold table 450, the difference field 475 is computed as the current object count 470 minus the base-line object count 465 in step 680. The average of all entries in column 475, divided by the number of objects in test set 260 is entered in improvement field 730 of the first record of improvement table 710.

Figure 7B:
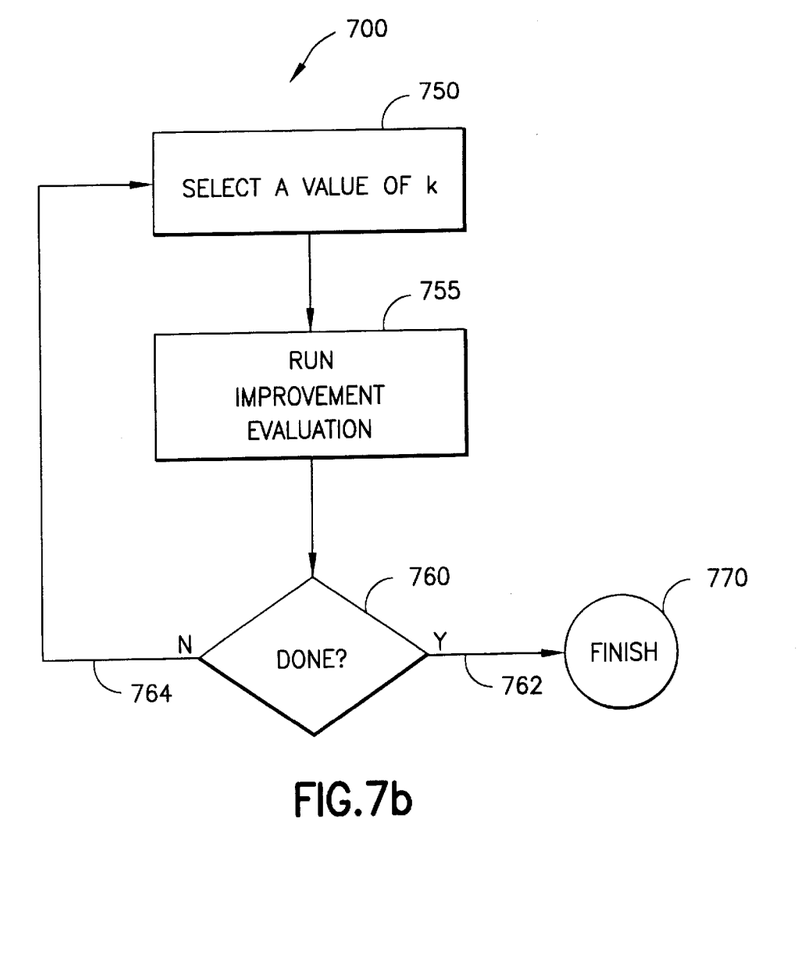
FIG. 7b is a flow-chart of the steps of optimizing the scaling constant.

FIG. 7, comprising FIGS. 7a and 7b depicts a data structure and flowchart showing the method steps of one preferred process executed by the present invention. Process 600 calculated, for the initially selected scaling parameter k, how many more objects on average, per error-level, could be accepted automatically over the base-line results. The purpose of the improvement process 700 is to determine the value of k for which the greatest such improvement occurs.

FIG. 7a shows improvement table 710, where row 720 stores values for scaling parameter k, and row 730 stores the corresponding improvement amount I.

FIG. 7b outlines the process for optimizing the value of scaling parameter k. In step 750 a new value of k is chosen. In step 755, the process described in FIG. 6 is performed, resulting in a new improvement amount I. The values for k and the improvement amount I are entered as fields 720 and 730 respectively in a new record in improvement table 710. Step 760 tests to see if the process is complete: if it is, branch 762 is followed to stop point 770, otherwise branch 764 is followed. This is the outline of any standard prior art optimization process, which seeks to find the value of k that yields the best improvement amount I.

Given an optimal value of k, the process in FIG. 6 is run again to re-populate threshold table 450. This categorization system performs optimally, in the following sense. The inherent accuracy of the categorization system, i.e. the baseline performance, (what percentage of documents are correctly categorized) is fixed and is not a subject of this invention. In the numerical example given earlier, the performance was 63.3%. When it is desired to have a smaller error-rate than this (for example 10%, which corresponds to a performance of 90%), this can be achieved by only automatically selecting a subset of categorized documents with best-scoring assigned categories, and ignoring the system's categorization results for poorly-scored documents, deferring them to human judgment. The difficulty here is that possibly only a small number of documents will be automatically categorized this way, leaving a lot of work for human categorizers. By optimizing the value of k the number of documents that can be automatically categorized is maximized, at a given error-level for a given base-line performance.

Figure 8:
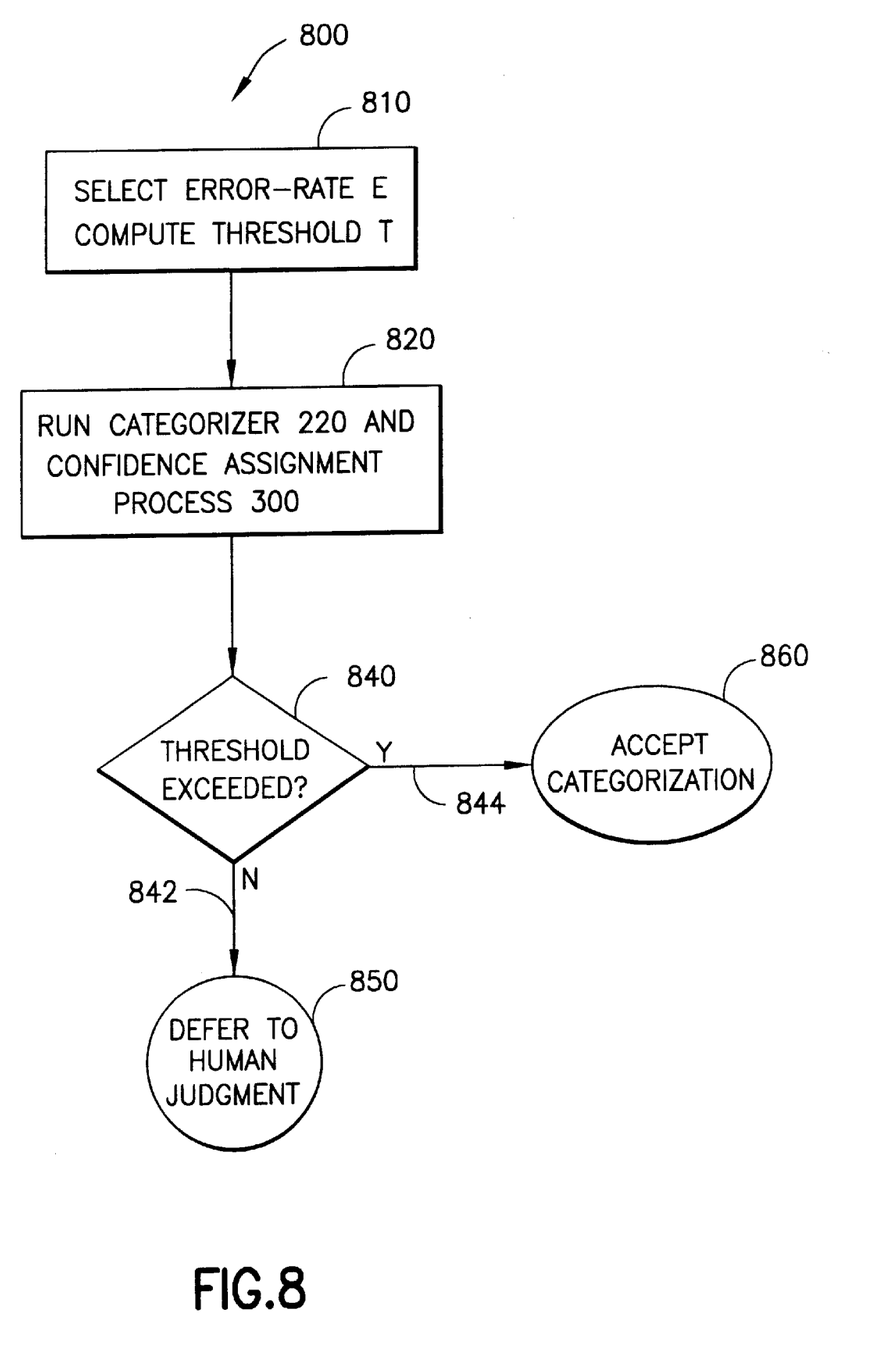
FIG. 8 is a flow chart of the steps of using the confidence assignment process in a practical setting of document categorization.

FIG. 8 is a flowchart showing the method steps of one preferred process 800 executed by the present invention.

This figure shows how the optimized system can be put into service in a practical setting to categorize documents.

In step 810, an error rate E (say 10%) is chosen. Correctness rate 1–E (e.g. 90%) is looked up in threshold table 450, giving threshold value T.

In step 820, the categorizer 220 is run, followed by confidence assignment process 300 for a document of interest D. Process 300 produces an improved confidence score C.

In step 840, C is compared against T. If C is less than T, branch 842 is followed to step 850, in which the categorization of D is deferred to human judgment. If C is greater than or equal to T, branch 844 is followed to step 860, in which the system's categorization results for D are accepted.

One of the practical uses of this invention is that of automatic electronic mail sorting, particularly for mail that isn't categorized with a tag. It is of interest to many people to have their electronic mail automatically sorted to make processing of that mail more efficient. To take a simple example, three categories could be defined in the index 130 of the categorizer 220: urgent mail, regular mail and junk mail. The individual would then benefit from such a system by knowing that the urgent mail needs to be attended to first, the junk mail last (if at all). However, if such a system is deployed, it is necessary that the system not make too many mistakes, although a small number of mistakes is probably inevitable. (This is the error rate selection 810.) If the system is unsure of the classification of a mail item, the decision should be deferred to the human. To make such a system useful, though, the number of mail items so deferred should be minimized, for whatever error-rate is deemed acceptable. To do this, step 820 is performed which results in fewer mail items falling below the threshold 840 and being deferred to the human 850.

Other applications of the invention include commercial systems which seek to categorize documents and/or route them to the appropriate individuals. This is a requirement of target marketing on the internet, where internet users have a known profile, i.e., interests, and mail and documents addressing those interests are sent to these specific individuals. Here the categories indexed 130 in the categorizer 220 would be the user interests, e.g., scientific articles, news stories, business information, sports, etc. Step 820 is run to insure that various documents 210 have a confidence level above the threshold 840 so that any documents requiring human judgement 850 are discarded. Therefore, process 800 the number of relevant documents that are discarded.

Process 800 also improved automatic routing of non-tagged documentation. Examples of this occur in business that receive different types of documents that are processed by different individuals/departments/functions in the business. For example, a service business, like the insurance business, electronically receives streams of information containing insurance claims, help-desk calls, purchase requests, letters of complaint, payment status requests, transcription of telephone calls etc. Step 820 improves the confidences that the documents have the proper category and therefore can be routed, or tagged with the category and routed, to the proper place in the business.

I claim:

1. A computer system for determining a confidence level of a category of one or more documents, comprising:
   a memory and a central processing unit (CPU);
   a categorization process executed by the CPU and generating a results table, one or more documents being categorized into one or more categories, each category corresponding to a score in said results table and each document having a size and one or more features; and
   a confidence process executed by the CPU on said results table to generate a threshold table, said confidence process determining a confidence level for said each category by taking a product of a first credibility that a highest scoring category of said categories is correct with a second credibility that a next highest scoring category of said categories is incorrect and normalizing the product by a third credibility that at least one of the highest and second-highest scoring categories is incorrect.

2. A system, as in claim 1, where the first and second credibilities are weighted by a raising each of the first and second credibilities to a power that is a function of the size of the document.

3. A system, as in claim 2, where the function is log(1+ N/k), where N is the size of the document and k is a constant.

4. A system, as in claim 3, where k is greater than 1 but less than N.

5. A system, as in claim 3, where an optimum value of k is empirically determined for one or more of the following: a set of documents and a set of features.

6. A system, as in claim 3, where N is measured by the number of features of the document.

7. A system, as in claim 6, where the document contains text and one or more of the features is the frequency of occurence of any one of the following: an individual word, an individual phrase, and an N-gram that is a sequence of one or more characters.

8. A system, as in claim 6, where the document contains audio and one or more of the features is the frequency of occurence of any one of the following: a pitch, an amplitude, and a duration of a note.

9. A system, as in claim 6, where the document contains still images and one or more of the features is the frequency of occurence of any one of the following: a color, a texture, and a shape.

10. A system, as in claim 1, where one of the confidence levels is correlated to a correctness level of a set of one or more correctness levels of the categorization process.

11. A system, as in claim 10, where each of the confidence levels is determined at an optimal empirical value of k.

12. A system, as in claim 1, where the documents can be any one or more of the following types: electronic mail, scientific articles, news stories, business information, sports information, requests to a service organization, a claim, a letter, and transcription of telephone calls.

13. A system, as in claim 12, where the documents are tagged with one or more of the types as determined by the category with the highest confidence level.

14. A system, as in claim 12, where the documents are routed to a location as determined by the category with the highest confidence level.

15. A method of verifying categorization of one or more documents, the method comprising the steps of:

taking a product of the credibility that a highest scoring document category is correct with a second credibility that a next highest scoring document category is incorrect;

normalizing the product by the credibility that at least one of the highest and second-highest scoring document categories is incorrect to create a confidence score; and assigning the document to the highest scoring document category if the confidence score is above a threshold.

16. A method as in claim 15, further comprising before the step of taking the product of credibilities, the step of:

generating intermediate values for the highest and next highest scoring categories, the intermediate value being generated according to $(1-S)^{log(1+N/k)}$ and wherein, S is the score of a corresponding category, N is determined by a corresponding document being scored and k is a scaling constant.

17. A method as in claim 15, wherein scaling constant k is initially set to the square root of an average number of categorized features and adjusted to increase the number of correctly categorized documents.

18. A system for verifying categorization of one or more documents, the system comprising:

means for taking a product of the credibility that a highest scoring document category is correct with a second credibility that a next highest scoring document category is incorrect;

means for normalizing the product by the credibility that at least one of the highest and second-highest document scoring categories is incorrect to create a confidence score; and means for assigning the document in the highest scoring document category if the confidence score is above a threshold.

19. A system as in claim 18, further comprising:

means for generating intermediate values for the highest and next highest scoring categories, the intermediate value being generated according to $(1-S)^{log(1+N/k)}$ and wherein, S is the score of a corresponding category, N is determined by a corresponding document being scored and k is a scaling constant.

20. A method as in claim 19, wherein scaling constant k is initially set to the square root of an average number of categorized features and further comprising:

means for adjusting k to increase the number of correctly categorized documents.

* * * * *